US011366086B2

(12) United States Patent
Zhang et al.

(10) Patent No.: US 11,366,086 B2
(45) Date of Patent: Jun. 21, 2022

(54) METHOD FOR DETERMINING WEIGHT-AVERAGE MOLECULAR WEIGHT AND CONTENT OF SOLUBLE SALT OF ACIDIC CARBOHYDRATES

(71) Applicants: SHANGHAI GREEN VALLEY PHARMACEUTICAL CO., LTD., Shanghai (CN); SOOCHOW UNIVERSITY, Suzhou (CN)

(72) Inventors: Zhenqing Zhang, Suzhou (CN); Yangyang Zeng, Shanghai (CN)

(73) Assignees: SHANGHAI GREEN VALLEY PHARMACEUTICAL CO., LTD., Shanghai (CN); SOOCHOW UNIVERSITY, Suzhou (CN)

( * ) Notice: Subject to any disclaimer, the term of this patent is extended or adjusted under 35 U.S.C. 154(b) by 354 days.

(21) Appl. No.: 16/763,139

(22) PCT Filed: Sep. 6, 2018

(86) PCT No.: PCT/CN2018/104326
§ 371 (c)(1),
(2) Date: May 11, 2020

(87) PCT Pub. No.: WO2019/047887
PCT Pub. Date: Mar. 14, 2019

(65) Prior Publication Data
US 2021/0010984 A1 Jan. 14, 2021

(30) Foreign Application Priority Data
Sep. 6, 2017 (CN) .......................... 201710795513.X

(51) Int. Cl.
G01N 30/88 (2006.01)
G01N 21/73 (2006.01)
G01N 30/74 (2006.01)

(52) U.S. Cl.
CPC ............. *G01N 30/88* (2013.01); *G01N 21/73* (2013.01); *G01N 30/74* (2013.01); *G01N 2030/884* (2013.01); *G01N 2030/8836* (2013.01)

(58) Field of Classification Search
CPC ........ G01N 30/74; G01N 21/73; G01N 30/88; G01N 2030/8836; G01N 2030/884
See application file for complete search history.

(56) References Cited

U.S. PATENT DOCUMENTS

2003/0224346 A1* 12/2003 Karlsson .................. B01J 41/20
435/4
2008/0248059 A1* 10/2008 Capannoli ............ A61K 47/646
424/197.11
2014/0051657 A1 2/2014 Dockal et al.

FOREIGN PATENT DOCUMENTS

CN 1437019 A 8/2003
CN 101059483 A 10/2007
(Continued)

OTHER PUBLICATIONS

Song et al., Determination of Absolute Molecular Weight and Distribution of Heparin and its similarities by SEC-MALLS Method. Chinese Journal of Pharmaceutical Analysis. Dec. 31, 2010;30(4):677-9.

(Continued)

*Primary Examiner* — Benjamin R Schmitt
(74) *Attorney, Agent, or Firm* — McCarter & English, LLP; Wei Song

(57) ABSTRACT

The invention belongs to the technical field of natural medicinal chemistry and quality control thereof, and relates to a method for determining the weight average molecular weight and the purity of a soluble salt of an acidic saccharide. The method comprises using metal ion content in the soluble salt of an acidic saccharide to correct the weight (Continued)

average molecular weight and the content of the of acid saccharide obtained by the combined use of the molecular sieve chromatography and a multi-angle laser scattering detector SEC-MALS. The method of the present invention can be used to more quickly and accurately determine the weight average molecular weight and content of acidic saccharide soluble salts.

8 Claims, 2 Drawing Sheets

(56) References Cited

FOREIGN PATENT DOCUMENTS

| CN | 103018364 A | 4/2013 | |
| --- | --- | --- | --- |
| CN | 103063754 A | 4/2013 | |
| CN | 103954716 A | 7/2014 | |
| CN | 106290614 A | 1/2017 | |
| CN | 106940348 A | 7/2017 | |
| EP | 2885642 A1 | 6/2015 | |
| FR | 2969618 A1 | 6/2012 | |
| FR | 3044314 A1 | 6/2017 | |
| JP | 2008-503716 A | 2/2008 | |
| KR | 20160030963 A | 3/2016 | |
| WO | 2003/071264 A1 | 8/2003 | |
| WO | 2014/028382 A1 | 2/2014 | |
| WO | WO-2015005928 A1 * | 1/2015 | ........... B01D 15/305 |

OTHER PUBLICATIONS

Song et al., Improvement of Determination of Calculation of Molecular Weight and Its Distribution of Dalteparin Sodium. Food and Drug. Dec. 31, 2014;16(3):171-3.
Zhang et al., Determination of Relative Molecular Mass and Molecular Mass Distribution of Pullulan by Means of SEC-MALLS. Chinese Journal of Pharmaceutical Analysis. Dec. 31, 2015;35(7):1213-7.
International Search Report Application No. PCT/CN2018/104326, dated Nov. 28, 2018, 6 pages.
Cheong et al., A rapid and accurate method for the quantitative estimation of natural polysaccharides and their fractions using high performance size exclusion chromatography coupled with multi-angle laser light scattering and refractive index detector. J Chromatogr A. Jun. 26, 2015;1400:98-106.
Compton, Synthesis and characterization of methacrylated hyaluronan-based hydrogels for tissue engineering. Theses and Dissertations (ETD), University of Tennessee Health Science Center. Dec. 31, 2014, 52 pages.
Muddiman et al., Characterization of PCR products from bacilli using electrospray ionization FTICR mass spectrometry. Anal Chem. Nov. 1, 1996;68(21):3705-12.
Korean Office Action for Application No. 10-2020-7009976, dated Aug. 23, 2021, 8 pages.
Beirne et al., Development and qualification of a size exclusion chromatography coupled with multiangle light scattering method for molecular weight determination of unfractionated heparin. Anal Bioanal Chem. Jan. 2011;399(2):717-25.
Du et al., An introduction of methods for determination of relative molecular mass of low molecular weight heparin. Chin J Pharm Anal. 2011;31(2):402-407.
Henriksen et al., On-line size-exclusion chromatography/mass spectrometry of low molecular mass heparin. J Mass Spectrom. Nov. 2004;39(11):1305-12.
Ren et al., Study on Preparation and Standardization of Reference Standard of Chondroitin Substance Sodium. Chin Pharm J. Feb. 2012;47(3):236-238.
Song et al., Determination of molecular weight and distribution of chondroitin sulfate sodium. Chinese Journal of New Drugs. 2011;20(18):1795-1797.
Chinese Office Action for Application No. 201710795513.X, dated Dec. 15, 2021, 16 pages.
Korean Office Action for Application No. 10-2020-7009976, dated Nov. 24, 2021, 7 pages.
Jeong et al., Degradation of cellulose at the wet-dry interface: I—study of the depolymerization. Cellulose. 2012;19:1135-1147.
Knobloch et al., Absolute molecular weight distribution of low-molecular-weight heparins by size-exclusion chromatography with multiangle laser light scattering detection. Anal Biochem. Feb. 15, 1997;245(2):231-41.
European Office Action for Application No. 18854050.4, dated May 17, 2021, 5 pages.

* cited by examiner

METHOD FOR DETERMINING WEIGHT-AVERAGE MOLECULAR WEIGHT AND CONTENT OF SOLUBLE SALT OF ACIDIC CARBOHYDRATES

CROSS-REFERENCE TO RELATED APPLICATIONS

This application is a U.S. national stage filing, under 35 U.S.C. § 371(c), of International Application No. PCT/CN2018/104326, filed on Sep. 6, 2018 which claims priority to Chinese Patent Application No. 201710795513.X, filed on Sep. 6, 2017. The entire contents of each of the aforementioned applications are incorporated herein by reference.

TECHNICAL FIELD

The invention belongs to the technical field of natural medicinal chemistry and quality control thereof, and specifically relates to the methods for determining of the weight average molecular weight and content of some types of acidic saccharides, and the method for quality control.

BACKGROUND ART

Polysaccharides are mostly biologically active compounds of natural origin, and can be derived from plants, fungi, etc. Polysaccharides have large molecular weights and complex structures. Therefore, accurate determination of the molecular weight of polysaccharides is a long time challenge.

At present, according to the Chinese Pharmacopoeia, high-performance liquid Gel Permeation Chromatography (GPC) is a common method for determining molecular weight. It is based on the principle of exclusion chromatography. Polysaccharides of different molecular weights pass through the column in the order of their sizes. A calibration curve is obtained through a series of measurement correlating the polysaccharide standards of different molecular weights and retention time, and then can the relative molecular weights of the corresponding polysaccharides be calculated. However, this conventional method needs polysaccharide standards, and is subject to certain limitations.

In addition, the common method for determining the content of polysaccharides and oligosaccharides is the carbazole sulfate method. The first step of the method is to obtain a standard curve based on the concentration and the color development of the monosaccharide standard, and then to read the content of the test sample on the standard curve. However, there is no commercial standard product for such acidic saccharide as monomannuronic acid. If glucuronic acid is used as a standard product, it has different structure and would be different in color rendering efficiency from the acidic saccharides, thereby failing to accurately quantify the acidic saccharides.

The size-exclusion chromatography/multi-angle laser light scattering (SEC-MALS) developed in recent years can determine the absolute weight-average molecular weight, molecular weight distribution and the content of samples, drawing extensive attention in the industry. Some researchers have used MALS and size exclusion chromatography (SEC) in combination, which can directly obtain such results as the molecular weight and molecular weight distribution without relying on the pump flow rate, calibration curve and other potentially false assumptions. MALS uses the light scattering amount of the sample separated from the column at different angles, and the eluent concentration and the dn/dc value obtained by the differential refractive index (RI) detector to calculate the mass. The molecular weight of each segment can be calculated by combining the two. This method does not require calibration using standard product, which overcomes the errors in the determination of the relative molecular weight caused by the differences in chemical composition, molecular structure, and size between the sample and the standard. Researchers have used this method to determine the average molecular weight of chitosan and hyaluronic acid (Monica Fee, Neil Errington, Kornelia Jumel, et al. Correlation of SEC/MALLS with ultracentrifuge and viscometric data for chitosans. *Eur Biophys J* (2003) 32: 457-464; Sanya Hokputsa, Kornelia Jumel, Catherine Alexander, et al. Comparison of molecular mass determination of hyaluronic acid using SEC/MALLS and sedimentation equilibrium. *Eur Biophys J* (2003) 32: 450-456). Some researchers have used this method to quantify natural neutral polysaccharides (Kit-Leong Cheong, Ding tao, Wu, Jing Zhao, et al. A rapid and accurate method for the quantitative estimation of natural polysaccharides and their fractions using high performance size exclusion chromatography coupled with multi-angle laser light scattering and refractive index detector, *Journal of Chromatography A* (2015) 1400: 98-106). At present, the European Pharmacopoeia has adopted this method as a method for determining the weight average molecular weight and molecular weight distribution of hydroxyethyl starch (European pharmacopoeia 8.0, p 3307-3308, starches hydroxyethyl).

In summary, SEC-MALS can be used to determine the weight average molecular weight and content of neutral polysaccharides.

SUMMARY OF THE INVENTION

However, the inventors of the present invention have found that the SEC-MALS method often cannot obtain accurate measurement results of acidic saccharides. To solve this problem, one aspect of the present invention provides an accurate and efficient method for determining the weight average molecular weight and the content of acidic saccharides, including the following steps:

(1) determining the weight average molecular weight and the content of the acidic saccharide in the acidic saccharide soluble salt samples using SEC-MALS;

(2) determining the content of salt-forming metal ions in the acidic saccharide soluble salt, thereby correcting the measurement result of the weight average molecular weight and the content of acidic saccharide in step (1), that is, dividing the measured weight average molecular weight and the content respectively by the mass percentage of the saccharide chain portion in the soluble salt of an acidic saccharide, thus obtaining the weight average molecular weight and the content of the acidic saccharide soluble salt, respectively.

According to one embodiment of the present invention, the weight average molecular weight and content of the acidic saccharide soluble salt should be corrected based on the SEC-MALS results according to the following formula 1 or formula 2:

$$\text{weight average molecular weight } M_w \text{ (Da)} = \ldots \ldots \frac{Mw1}{(1-A)}; \quad \text{Formula (1)}$$

In the above formula (1), $M_{w1}$ is the weight average molecular weight (Da) of acidic saccharide directly obtained by SEC-MALS; A is the content of metal ions in the acidic saccharide soluble salt;

$$\text{Content (\%)} = \frac{X}{Y(1-A)} \times 100\%; \quad \text{Formula (2)}$$

In the above formula (2): X is the mass (μg) calculated by the spectrum processing software; Y is the mass (μg) of the injected sample; A is the content of metal ions in the acidic saccharide soluble salt.

The method provided by the present invention can accurately determine the weight average molecular weight and the content of acidic saccharide soluble salts, and successfully solves the problems of large deviations in weight average molecular weight determination of acidic saccharide soluble salts and inaccurate content quantification in the saccharide chemistry field.

SPECIFIC DESCRIPTION OF THE EMBODIMENTS

Definition

Figure 1:
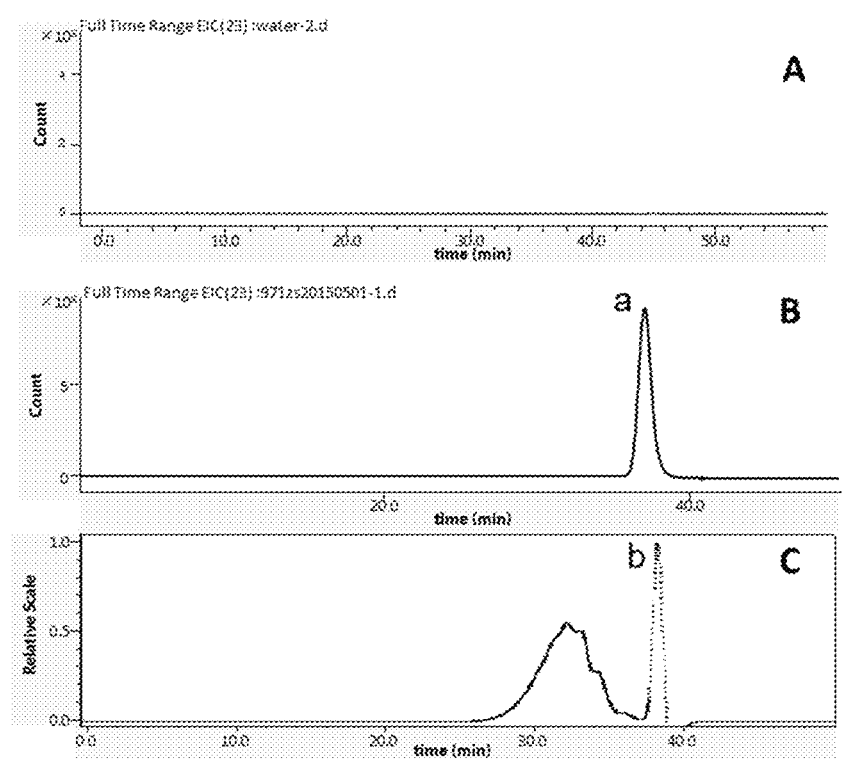
FIG. 1 shows the SEC-ICP-MS spectrum of the solvent (A) and the sodium salt of oligomannuronic diacid (B) and the SEC-MALS RI chromatogram of the sodium salt of oligomannuronic diacid (C).

Unless otherwise stated, all percentages, ratios, or parts are by weight.

Unless otherwise defined, all technical and scientific terms used herein have the same meaning as commonly known to those skilled in the art. In addition, any methods and materials similar or equivalent to those described can be used in the method of the present invention. The preferred implementation methods and materials described in the present application are for illustration purposes only.

As used herein, the term "dn/dc" refers to the increase in refractive index and can be determined using methods known in the art (Liu Lili et al., Method for determining the absolute molecular weight and distribution of medical sodium hyaluronate gels [J] Drug Analytical Journal 2013, 33 (8), 1435-1438); it can also be obtained from searching relevant disclosures in the art.

As used herein, the term "SEC-MALS" refers to Size-Exclusion Chromatography/Multi-Angle Laser Light Scattering. It has been widely used in recent years to determine the absolute weight average molecular weight and molecular weight distribution and content of samples. Specific methods can be those known in the art (Monica Fee, Neil Errington, Kornelia Jumel, et al., Correlation of SEC/ MALLS with ultracentrifuge and viscometric data for chitosans. Eur Biophys J (2003) 32: 457-464; Sanya Hokputsa, Kornelia Jumel, Catherine Alexander, et al., Comparison of molecular mass determination of Hyaluronic acid using SEC/MALLS and sedimentation equilibrium. Eur Biophys J (2003) 32: 450-456; Kit-Leong Cheong, Ding tao Wu, Jing Zhao, et al., A rapid and accurate method for the quantitative estimation of natural polysaccharides and their fractions using high performance size exclusion chromatography coupled with multi-angle laser light scattering and refractive index detector, Journal of Chromatography A (2015) 1400: 98-106).

As used herein, the term "ICP-MS" refers to the inductively coupled plasma mass spectrometry, which is a major development in contemporary element composition measurement technology. The method has many advantages, such as high sensitivity, low interference, ultra-low detection limits, and multiple-element simultaneous analysis capability, among others. Specific methods of carrying out the ICP-MS include those known in the art, such as that described in Feng Xianfeng and Qu Taiyuan, the latest application progress of inductively coupled plasma mass spectrometry (ICP-MS). China Inorganic Chemical Analysis, (2011) 1: 46-52.

As used herein, the term "ICP-OES" refers to Inductively Coupled Plasma Optical Emission Spectrometer, which is a known method in the art for determining the content of metal ions. Specific embodiments include those known in the art.

Discovery of the Technical Problems

The inventors of the present application found that, when using SEC-MALS to test oligomannuronic diacid samples, the purity result obtained was unreasonable; there were unknown peaks following those of oligomannuronic diacid, and the weight-average molecular weight obtained by MALS based on content was further deviated. In addition, this problem was found not only in oligomannuronic diacids, but also in many other saccharides, such as polymannuronic acid, polyguluronic acid, alginic sodium diester, polymannuronate sulfate, polyguluronate sulfate, heparin, etc. These saccharides are all saccharides containing acidic groups, that is, the saccharide structure contains anions such as carboxyl group, sulfate group or phosphate group. In the present application, such saccharides are referred to as acidic saccharides.

The usual reaction to the phenomenon is that it is caused by the adsorption of the sample on the column, which caused reduction of the content. However, after experiments, the inventors found that this problem still remains after multiple separations on columns. In order to solve this issue, the inventors analyzed the unknown peaks in the SEC-MALS results of the acidic saccharides. They found that the unknown peaks are essential to obtain the accurate weight average molecular weight and content of acidic saccharide soluble salts. Therefore, an efficient, simple and stable method for measuring the weight average molecular weight and the content of acid saccharides is developed.

The inventors of the present invention found that the unknown peak belongs to the metal ion in the acidic saccharide structure. Therefore, after the acidic saccharide is converted into a sodium salt, the molecular weight change due to conversion to sodium salt is determined, thereby is used to adjust the weight average molecular weight of the obtained saccharide, and hence a more accurate result.

Acidic Saccharide

In some embodiments of the present invention, the acidic saccharide soluble salt is selected from those having one or more of a carboxyl group, a sulfate group, or a phosphate group in the structure.

In some embodiments of the present invention, the acidic saccharide soluble salt is selected from those having saccharide chain structures such as oligomannuronic diacid, polymannuronic acid, polyguluronic acid, alginic sodium diester, polymannuronate sulfate, polyguluronate sulfate, heparin, low molecular weight heparin, chondroitin sulfate, dermatan sulfate, keratan sulfate, hyaluronic acid, PI88, fucoidan sulfate, carrageenan, or dextran sulfate. But acidic saccharides suitable for the method of the present invention include, but are not limited to, the above-mentioned types.

In some embodiments of the present invention, the acidic saccharide soluble salt includes, but is not limited to, a saccharide having the following saccharide chain structure: oligomannuronic diacid, heparin, or low molecular weight heparin.

Determination of Metal Ion Content

In an embodiment of the present invention, the method for determining the metal ion content in the acidic saccharide soluble salt is selected from the group consisting of ICP-MS, ICP-OES, atomic absorption and ion chromatography, preferably, ICP-MS, ion chromatography, and more preferably ion chromatography. These assays are described previously.

Inductively coupled plasma mass spectrometry (ICP-MS) is a major development in contemporary element composition analysis. It has many advantages such as high sensitivity, low interference, ultra-low detection limit, and simultaneous multi-element analysis capability. See Feng Xianfeng and Qu Taiyuan, recent progress in the application of inductively coupled plasma mass spectrometry (ICP-MS); China, Inorganic Chemical Analysis, (2011) 1: 46-52. The inventors tried to combine SEC with ICP-MS for the first time, and successfully confirmed that the unknown peak after SEC-MALS measurement of the acidic saccharide soluble salt sample peak was a metal ion, and at the same time, it is possible to obtain data about the type and content of the metal ion.

On such basis, the weight-average molecular weight and content determined by the SEC-MALS can be corrected by the measured types and contents of ions. That is, the measured weight-average molecular weight and content is divided by the mass percentage of the saccharide chain portion in the acidic saccharide-soluble salt, thereby obtaining the weight average molecular weight and content of the acidic saccharide soluble salt, respectively.

Determination of Molecular Weight and Content by SEC-MALS

According to the present invention, the SEC-MALS is used to determine the molecular weight and content of acidic saccharides. When conducting the SEC-MALS method, the samples of acidic saccharide soluble salts dissociate after entering the SEC column for analysis (see Example 1). It can be seen that the weight-average molecular weight and content obtained by the SEC-MALS are for acidic saccharides without metal ions, and thus the weight-average molecular weight and content of acidic saccharide soluble salts should also consider the metal ion content. There have been no reports on this in current SEC-MALS methods.

In the SEC-MALS method used in the present invention, an alcohol/salt solution can be used as a mobile phase; its flow rate may be 0.1-0.5 mL/min; wherein the alcohol content in the mobile phase is 0-20%. The alcohol may be methanol, ethanol, propanol, cyclohexanol or a mixture thereof; the salt is selected from $NH_4Ac$, NaAc, NaCl, $NaNO_3$ or $Na_2SO_4$, and the concentration of the salt solution can be 0.02-0.5 mol/L.

In another preferred embodiment of the present invention, the SEC-MALS measurement uses 20% methanol and 80% 80 mmol/L $NH_4Ac$ as the mobile phase, and its flow rate is 0.1 mL/min.

In another preferred embodiment of the present invention, the method further includes a step of determining a refractive index increase (dn/dc) of the acidic saccharides.

In another preferred embodiment of the present invention, the determination of the refractive index increase (dn/dc) of the acidic saccharides includes the following steps:

(1) Using the same mobile phase as the SEC-MALS measurement to dissolve the acidic saccharide samples and diluting the samples to form a series solution of 5-6 concentration points within the range of 0.1 mg/ml-2 mg/ml;

(2) Injecting into a refractive index detector (such as Wyatt, Optilab T-rEX (WTREX-08)) respectively the mobile phase and sample solution prepared in step (2), and collecting the signals;

(3) Calculating dn/dc with Astra software.

In one embodiment of the present invention, the weight average molecular weight and content of the acidic saccharide should be determined as follows:

Step 1: Determining the Weight Percentage A of Metal Ions in an Acidic Saccharide by ICP-MS, ICP-OES, Atomic Absorption, or Ion Chromatography Step 2: Determining the dn/dc of the Acidic Saccharide (1) take a certain amount of sample, add the mobile phase to dissolve it, and formulate it to a series solution of 0.1-5 mg/ml, preferably 0.2-2 mg/ml, in which the concentration of the series solution may be, for example, 0.2 mg/ml, 0.4 mg/ml, 0.8 mg/ml, 1.2 mg/ml, 1.8 mg/ml, 2 mg/ml; using an alcohol/salt solution as a mobile phase, wherein said alcohol content in the mobile phase is 0-20%. The alcohol may be methanol, ethanol, propanol, cyclohexanol or a mixture thereof; the salt is selected from $NH_4Ac$, NaAc, NaCl, $NaNO_3$ or $Na_2SO_4$, and the concentration of the salt solution is 0.02-0.5 mol/L;

(2) inject into a refractive index detector (such as Wyatt, Optilab T-rEX (WTREX-08)), sequentially, the mobile phase and the series of solutions prepared in step (1), and collect the signals; and (3) calculate dn/dc by Astra software;

Step 3: Determine the Molecular Weight and Content of Acidic Saccharides by SEC-MALS (1) select a suitable column according to the estimated molecular weight range of the acid saccharides;

(2) prepare a gradient solution of acidic saccharide samples to be tested, which can have a concentration range of 2-500 mg/ml in 3-10 gradients; for example, a series of solutions with concentrations of about 2, 10, 50, 100, 300 mg/ml (concentration=weight/volume).

(3) using an alcohol/salt solution as the mobile phase, with a flow rate of 0.1-0.5 mL/min; wherein the content of alcohol in the mobile phase is 0-20%. The alcohol may be methanol, ethanol, propanol, cyclohexanol or a mixture thereof; the salt is selected from $NH_4Ac$, NaAc, NaCl, $NaNO_3$ or $Na_2SO_4$. The concentration of the salt solution can be 0.02-0.5 mol/L. The detector used can be an eighteen-angle laser detector and a refractive index detector.

(4) The weight average molecular weight $M_{w1}$ of the acidic saccharide is directly obtained by SEC-MALS;

(5) The mass X of acidic saccharides in the sample is calculated by the spectrum processing software;

(6) The weight average molecular weight and content of acidic saccharides are calculated by the following formula:

$$\text{weight average molecular weight } M_w \ (Da) = \ldots \cdot \frac{Mw1}{(1-A)} \quad \text{Formula (1)}$$

In the above formula (1): $M_{w1}$ is the weight average molecular weight (Da) of the acidic saccharide directly obtained by SEC-MALS method; A is the metal ion content of the acidic saccharide;

$$\text{Content (\%)} = \frac{X}{Y(1-A)} \times 100\%; \quad \text{Formula (2)}$$

In the above formula (2), X is the mass calculated based on the processing software; Y is the mass of the injected sample; A is the content of metal ions in the acidic saccharide.

The specific operation conditions for SEC-MALS in determining the weight average molecular weight and content can be performed according to conventional experiment protocols.

The present invention has the following advantages:

(1) Unknown peaks in SEC-MALS analysis of acidic saccharide soluble salt samples were successfully characterized;

(2) The weight-average molecular weight and content of acidic saccharide soluble salts can be accurately determined with good repeatability.

(3) The weight average molecular weight and content of the sample can be obtained in one analysis by simple operation method.

(4) The accuracy of measuring acidic saccharide soluble salts is improved, which helps to more accurately study the molecular structure of polysaccharides.

EXAMPLES

The present invention will be further described below with reference to the specific examples. It should be understood that these examples are only for illustration purpose only and are not to limit the scope of the present invention. For the experiment conditions not specified in the following examples, reference can be made to conventional conditions or the conditions recommended by the manufacturer.

The instruments used in the Examples section include:
Liquid Chromatography: Agilent 1260 Liquid Chromatograph
18-angle Laser Detector: Wyatt DAWN HELEOS II
Refractive Index Detector: Wyatt Optilab T-rEX
ICP-MS: Agilent 7900 ICP-MS
Ion Chromatography: Metrohm Switzerland
ICP-OES: Perkin-Elmer Company Optima7000DV Inductively Coupled Plasma Emission Spectrometer
Flame Atomic Absorption: Beijing Rayleigh WFX-120B Flame Atomic Absorption Spectrometer Example 1: SEC and ICP-MS Revealed the Mechanism of the Separation of Acidic Saccharides in Size Exclusion Chromatography (1) The test sample used was sodium salt of oligomannuronic diacid. The sample was dissolved in water to have a concentration of 2 mg/ml; an amount of 0.1 μl sample was injected. Chromatography was conducted on the SEC column Waters ACQUITY UPLC @ BEH125 Å SEC 1.7 μm 4.6×300 mm (purchased from Waters), using 20 mmol/L $NH_4Ac$ as the mobile phase, and the flow rate being 0.1 mL/min; SEC was combined with ICP-MS to collect $^{23}$Na signal. Meanwhile, solvent water was used as a control.

(2) SEC was used in association with MALS, and the sample sodium salt of oligomannuronic diacid was dissolved in the mobile phase at a concentration of 10 mg/ml; an amount of 20 μl sample was injected.

FIG. 1 shows the SEC-ICP-MS spectrum of the solvent water (FIG. 1A) and sodium salt of oligomannuronic diacid (FIG. 1B), and the SEC-MALS RI chromatogram of the sodium salt of oligomannuronic diacid (FIG. 1C). The results show that in the SEC-ICP-MS spectrum, as compared with the negative control, the sodium salt of oligomannuronic diacid has a significant Na salt peak at point a. Comparing FIG. 1B and FIG. 1C, it can be seen that the Na salt peak at point a in the SEC-ICP-MS spectrum of the sodium salt of oligomannuronic diacid is consistent with the position of peak b in the RI chromatogram, indicating that the unknown peak b in the difference spectrum is the sodium salt peak. This means that after entering SEC column, the salt of oligomannuronic diacid dissociated during the experiment. The SEC-MALS method therefore obtained a weight-average molecular weight and content of oligomannuronic diacid without metal ions after dissociation. Therefore, in order to accurately calculate the weight-average molecular weight and content of soluble salts of acid saccharides, when using SEC-MALS, the metal ions in the soluble salt of acid saccharide must be considered for correction purpose. Specific calculations can be found in Formula 1 and Formula 2.

$$\text{Corrected weight average molecular weight } Mw \ (Da) = \frac{Mw1}{(1-A)} \quad \text{Formula (1)}$$

In the above formula (1): $M_{w1}$ is the weight average molecular weight (Da) of acid saccharide directly obtained by SEC-MALS; A is the content of metal ions.

$$\text{Corrected Content (\%)} = \frac{X}{Y(1-A)} \times 100\%; \quad \text{Formula (2)}$$

In the above formula (2): X is the mass calculated by the spectrum processing software (μg); Y is the mass of the injected sample (μg); A is the content of metal ions.

Example 2: SEC-MALS Used to Determine the Weight-average Molecular Weight and Content of Heparin and Low-molecular-weight Heparin Samples: Heparin Sodium, Enoxaparin Sodium, Nadroparin Calcium, and Heparin H, Prepared into Solutions

Step 1: Determination of Metal Ion Content by SEC-ICP-MS (1) Chromatography was conducted on Waters ACQUITY UPLC @ BEH200 Å SEC 1.7 um 4.6×150 mm column, with mobile phase of 80 mmol/L NH$_4$Ac and flow rate being 0.1 mL/min.

(2) SEC was associated with ICP-MS: the samples were dissolved in water to have a concentration of 0.02 mg/ml, 20 μl of the samples were injected and signals of $^{23}$Na, $^{43}$Ca, and $^{44}$Ca were collected. The weight of the metal ions (A value) in the sample was calculated using the above signals and those obtained from standard solutions of Na ion and Ca ion at concentrations of 0.1 ppm, 0.5 ppm, 1.0 ppm, 5.0 ppm, and 10.0 ppm, respectively.

Step 2: Determine dn/dc (1) 20 mg sample was put into a 10 ml flask, dissolved with the mobile phase in step 3 and shook well to obtain the stock solution. 0.2 ml, 0.4 ml, 0.8 ml, 1.2 ml, and 1.8 ml of the stock solution were respectively diluted into 2 ml mobile phase to obtain a series solutions of 0.2 mg/ml, 0.4 mg/ml, 0.8 mg/ml, 1.2 mg/ml, 1.8 mg/ml, and 2 mg/ml.

(2) the mobile phase, the 0.2 mg/ml, 0.4 mg/ml, 0.8 mg/ml, 1.2 mg/ml, 1.8 mg/ml, and 2 mg/ml sample solutions, were manually injected into the refractive index detector (Wyatt, Optilab T-rEX(WTREX-08)) and the signals were collected; dn/dc was calculated by Astra software, as shown in the following table:

| sample | dn/dc (mL/g) |
|---|---|
| Heparin sodium | 0.1311 |
| Enoxaparin sodium | 0.1341 |
| Nadroparin calcium | 0.1382 |
| Heparin H | 0.1310 |

Step 3: Determination of Weight Average Molecular Weight and Content by SEC-MALS (1) Chromatography was conducted on Waters ACQUITY UPLC @ BEH200 Å×SEC 1.7 column. 80 mmol/L NaCl was used as the mobile phase, and the flow rate was 0.1 mL/min.

(2) SEC was used in association with MALS, the sample was dissolved in the mobile phase to have a the concentration of 10 mg/ml, and 20 μl of the sample was injected, that is, the Y value in the formula is 200 μg.

Figure 2:
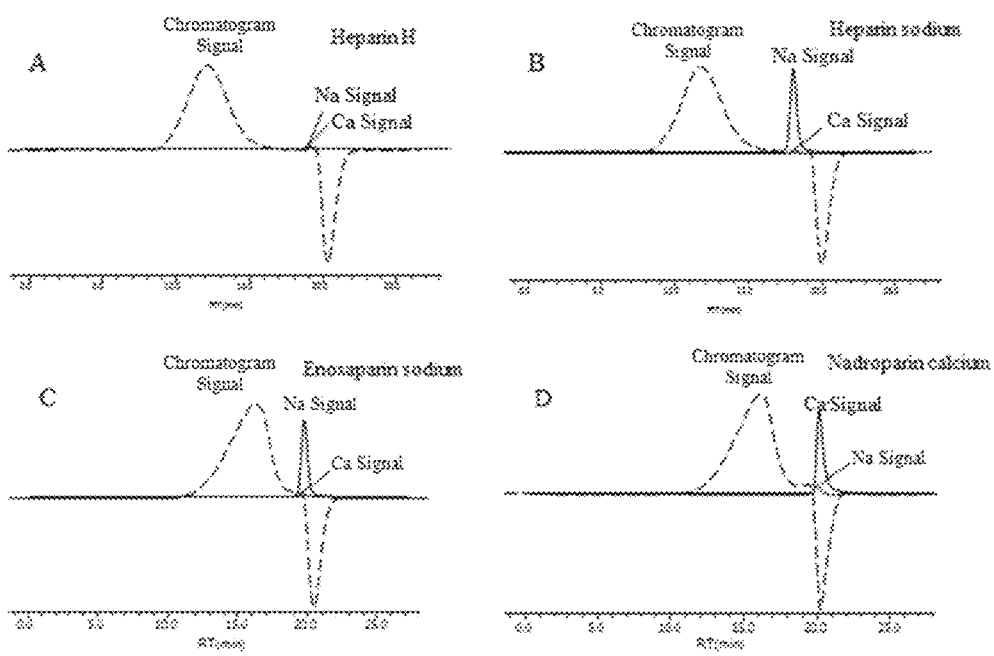
FIG. 2 shows the RI chromatogram (RI, dashed line) of Heparin H (2A), Heparin sodium (2B), Enoxaparin sodium (2C) and Nadroparin calcium (2D), as well as the Na ion SEC-ICP-MS spectrum (Na, solid line) and Ca ion SEC-ICP-MS spectrum (Ca, solid line).

The results of Example 2 were shown in Table 1 and FIG. 2.

TABLE 1 metal ion content, weight average molecular weight and content of Heparin and low molecular weight heparin before and after correction

| Sample | Mw1 (kDa) | X value (μg) | X/Y % | A value | corrected * Mw (kDa) | corrected * Content % |
|---|---|---|---|---|---|---|
| Heparin sodium | 15.9 | 182.0 | 91.0 | 10.6$^a$ | 17.8 | 101.8 |
| Enoxaparin sodium | 4.3 | 179.1 | 89.5 | 10.56$^a$ | 4.8 | 100.1 |
| Nadroparin calcium | 4.5 | 178.3 | 89.2 | 10.67$^b$ | 5 | 99.8 |
| Heparin H | 15.6 | 197.1 | 98.5 | 0.87$^a$ | 15.7 | 99.4 |

Y value is 200 ug;
* Corrected using the formula in Example 1;
$^a$is Na %;
$^b$is Ca %.

The results of Example 2 are shown in FIG. 2 and Table 1. From comparison of 2A and 2B (heparin H and heparin sodium), it can be seen that the RI chromatogram were the same, but at the negative peak (due to the influence of fluidity and sample solvent, the RI chromatogram at the salt peak position can show either a positive peak or an inverted peak), heparin H has no Na signal, while heparin sodium has a Na signal, and 2C and 2D (enoxaparin sodium and nadroparin calcium) also have Na or Ca signals, indicating that hydrogen heparin does not contain Na, while the acidic saccharides heparin sodium, enoxaparin sodium and nadroparin calcium, dissociated on the SEC column, and the metal ions showed delayed peaks. From Table 12, it can be seen that the Mw1 of heparin sodium and heparin H are similar, indicating that the weight average molecular weight directly measured by SEC-MALS was for the saccharide portion; after the metal ion content was determined to obtain the A value, the formula in Example 1 was applied for correction. It was found that the difference before and after correction was significantly increased. The X/Y % of heparin H was close to 100%, and the corrected content for heparin sodium was close to 100%, indicating that the SEC-MALS directly measured the content of the saccharide portion; the same method was used to calculate weight-average molecular weight and content of enoxaparin sodium and nadroparin calcium. In summary, after correction, SEC-MALS can be used to accurately obtain the weight average molecular weight and content of heparin salt and low molecular weight heparin salt.

Example 3: Verification Between SEC-MALS Method and Mass Spectrometry Method Sample: Pentamannuronic Diacid (Na Type)

(1) Chromatography was conducted on Waters ACQUITY UPLC @ BEH125 Å SEC 1.7 μm 4.6×300 mm column, and 20% methanol+80% 80 mmol/L NH$_4$Ac were used as the mobile phase, and the flow rate was 0.1 mL/min.

(2) SEC was used in association with MALS. The sample was dissolved in the mobile phase at a concentration of 10 mg/ml and 20 μl was injected.

(3) The SEC was associated with mass spectrometry. The sample was dissolved in water at a concentration of 10 mg/ml and 10 μl was injected.

(4) Determination of metal ions in acidic saccharide by ion chromatography.

Standard solution of sodium ion was prepared to have 25, 10, 12.5, 6.25, 3.125 ppm. The sample concentration was 2 mg/ml. Conditions for ion chromatography were as follows: pre-column: Metrosep C4 Guard/4.0; separation column: Metrosep C5-150/4.0; mobile phase: 5 mM nitric acid solution in ultra-pure water; flow rate: 0.9 ml/min; injected volume: 20 μl. External standard method was used to determine the metal ion content.

The measurement of the metal ion content (A) of pentamannuronic diacid (Na type) was carried out as in Example 1.

Figure 3:
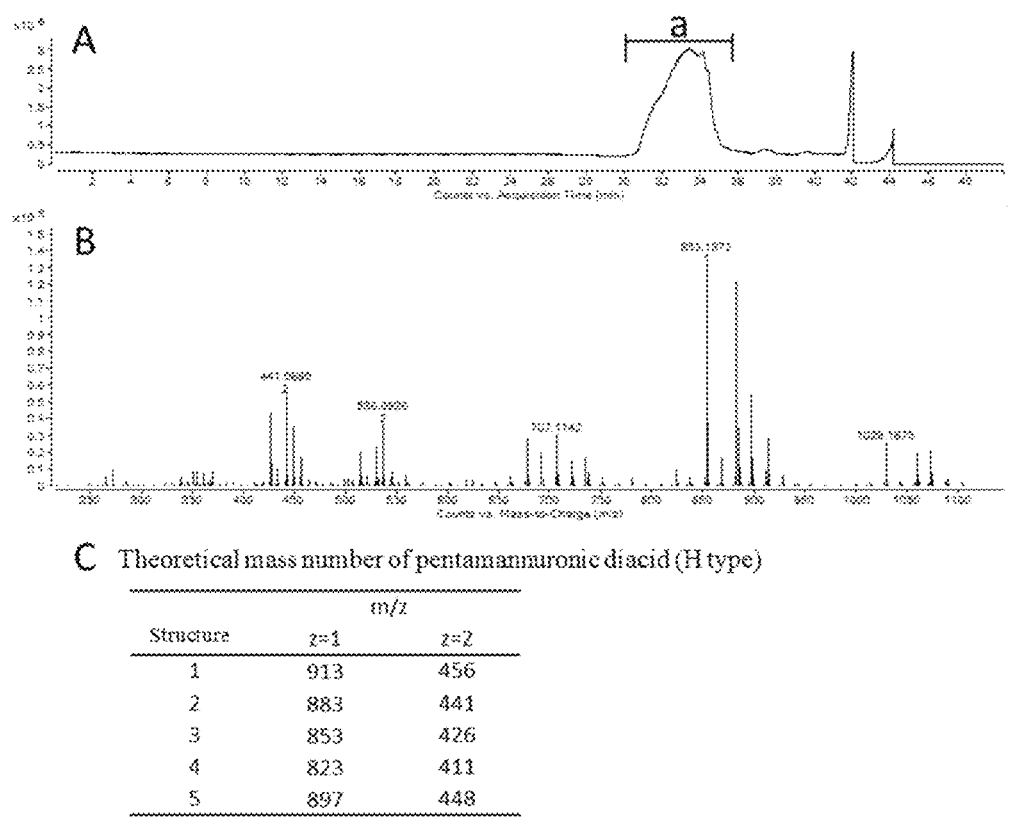
FIG. 3 shows the total ion current (A) and the mass spectrum (B) of the sodium salt of pentasaccharide oligomannuronic diacid, as well as the H-form theoretical mass number list of the pentasaccharide oligomannuronic diacid (C).

The results of Example 3 are shown in FIG. 3 and Table 2.

In FIG. 3, the mass spectrum B is the cumulative mass spectrum of the peak position a in the total ion chromatogram. It can be seen from the graph B and Table C that the mass number of the pentamannuronic diacid measured by the mass spectrum is consistent with the theoretical mass number. That is, the molecular weight of pentamannuronic diacid (H type) is 854-914 Da.

TABLE 2

| | SEC-MALS results of pentamannuronic diacid (Na type) | | | | | |
|---|---|---|---|---|---|---|
| | Mw1 (Da) | X value | X/Y (%) | A value (%) | corrected * Mw (Da) | corrected * content (%) |
| 1 | 907 | 168.8 | 84.4 | 12.4 | 1035.4 | 96.3 |
| 2 | 914 | 171.6 | 85.8 | 11.9 | 1037.5 | 97.4 |
| 3 | 902 | 173.6 | 86.8 | 12.7 | 1033.2 | 99.4 |
| average value | 908 | 171.3 | 85.7 | 12.3 | 1035.4 | 97.7 |
| RSD % | 0.66% | 1.41% | 1.41% | 3.28% | 0.20% | 1.60% |

Y is 200 μg;
* corrected by using the formula in Example 1.

From Table 2 of the SEC-MALS results of sodium salt of pentamannuronic diacid, it can be seen that the weight average molecular weight determined by SEC-MALS is 908 Da; FIG. 3 shows the LC-MS result (A is the total ion chromatogram of the sodium salt of pentamannuronic diacid, B is the mass spectrum, and C is the list of theoretical mass number). As shown in the mass spectrum, the molecular weight was 854-914 Da, which was found to be the molecular weight of pentamannuronic diacid (H type), consistent with the result of SEC-MALS result. This further explained that the result of SEC-MALS is the weight-average molecular weight and content of the hydrogen-type pentamannuronic diacid without metal ions, which is consistent with the conclusion of Example 1. After correction, the pentamannuronic diacid (sodium type) has a weight average molecular weight of 1035 Da and a content of 97.7%.

Example 4: SEC-MALS Used to Determine the Weight-average Molecular Weight and Content of PI88

PI88 is an acidic saccharide containing phosphate and sulfate groups. The preparation method can be found in Guangli Yu, Nur Sibel Gunay, Robert J. Linhardt, et al., Preparation and anticoagulant activity of the phosphosulfomannan PI-88, European Journal of Medicinal Chemistry 37 (2002) 783-791.

Step 1: Determination of Metal Ion Content by ICP-OES

The line of Na 589 nm was collected, and 1 mg/L, 5 mg/L, and 10 mg/L Na standard solution were prepared; the sample solution concentration is prepared as 20 mg/L. ICP-OES was used to determine metal ion content.

Step 2: Measuring dn/dc of PI88

The method was the same as step 2 in Example 2.

Step 3: Determination of Weight-average Molecular Weight and Content by SEC-MALS The method was the same as in step 3 of Example 2.
The results of Example 4 are shown in Table 3.

TABLE 3

| | metal ion content, dn/dc, weight average molecular weight and content before and after calibration of PI88 | | | | | | |
|---|---|---|---|---|---|---|---|
| Sample | A value (%) | dn/dc | Mw1 (Da) | X (ug) | X/Y (%) | corrected* Mw (Da) | Corrected* content (%) |
| PI88 | 14.3 | 0.1421 | 2100 | 167.6 | 83.8% | 2450 | 97.8% |

Y is 200 μg;
*corrected by using the formula in Example 1

As can be seen from Table 3, after correction, SEC-MALS can be used to accurately calculate the weight average molecular weight and content of oligosaccharide PI88, which contains phosphate and sulfate group. Its weight average molecular weight is 2450 Da and the content is 97.8%.

Example 5: SEC-MALS Used to Determine the Weight-average Molecular Weight and Content of Sodium Chondroitin Sulfate

Step 1: Determination of Metal Ion Content by Flame Atomic Absorption

The spectral line of Na 330.2 nm was collected, and 1 mg/L, 10 mg/L, 50 mg/L, 75 mg/L, and 100 mg/L Na standard solutions were prepared. External standard method was used to calculates the concentration of metal ions in the sample (i.e., the A value), and the sample solution concentration was 200 mg/L.

Step 2: Determination of Weight-average Molecular Weight and Content by SEC-MALS (1) Chromatography was conducted on Column TSK G3000PWXL 7.8×300 mm, and 0.3 mol/L $Na_2SO_4$ was used as the mobile phase, with a flow rate of 0.5 mL/min, and a column temperature of 35° C.
(2) SEC was used in association with MALS, the concentration of the sample solution in the mobile phase was 10 mg/ml, and the injected volume was 25 μl.
The results of Example 5 are shown in Table 4.

TABLE 4 metal ion content, dn/dc and weight average molecular weight and content of sodium chondroitin sulfate before and after correction

| Sample | A value % | dn/dc | Mw1 (Da) | X (ug) | X/Y (%) | corrected * Mw (Da) | corrected * content (%) |
|---|---|---|---|---|---|---|---|
| Sodium chondroitin sulfate | 9 | 0.1427 | 17k | 181.4 | 90.7% | 18.7k | 99.7% |

Y is 200 μg;
* corrected by the formula in Example 1

The dn/dc in Table 4 is from the literature (Song Yujuan, Ren Liping, and Fan Huihong, Determination of the molecular mass and distribution of chondroitin sodium sulfate, China Journal of New Drugs, 2011, 20 (18), 1795-1797). After correction, SEC-MALS can be used to accurately calculate the weight-average molecular weight and content of the sodium chondroitin sulfate, which contains sulfate and carboxylate groups. The weight-average molecular weight is 18.7 kDa and the content is 99.7%.

Example 6: SEC-MALS Used to Determine the Weight Average Molecular Weight and Content of Several Polysaccharide Soluble Salts Both polymannuronic acid sodium and polyguluronic acid sodium contain carboxyl groups; polymannuronic acid sulfate sodium salt, polyguluronic acid sulfate sodium and alginic sodium diester contain carboxyl and sulfate groups; keratan sulfate and fucoidan sulfates contain sulfate groups.

Step 1: ICP-MS Was Used to Determine the Content of Metal Ions

According to the literature disclosure, the polysaccharides in the above samples are all in their Na salt forms, and thus the signal of $^{23}Na$ was collected. Samples were dissolved in water at a concentration of 0.02 mg/ml; Na standard solutions were prepared at concentrations of 0.1 ppm, 0.5 ppm, 1.0 ppm, 5.0 ppm and 10.0 ppm.

Step 2: Determination of dn/dc

The method was the same as in step 2 of Example 2.

Step 3: Determination of Weight-average Molecular Weight and Content by SEC-MALS (1) Chromatography column: see Table 5 for details.
(2) SEC was used in association with MALS. The concentration of the sample solution in the mobile phase was 10 mg/ml, and the injected volume was 20 μl.
The results of Example 6 are shown in Table 5.

TABLE 5

Metal ion content, dn/dc, column used, weight average molecular weight and content for several polysaccharides before and after calibration

| | A value (%) | dn/dc | column | Mw1 (Da) | X (ug) | X/Y (%) | Corrected * Mw (Da) | Corrected * content (%) |
|---|---|---|---|---|---|---|---|---|
| Sodium Polymannuronate | 11 | 0.1370 | x Brige waters beh | 6.1k | 178.6 | 89.3 | 6.9k | 100.3 |
| sodium salt of Polymannuronic acid sulfate | 15.7 | 0.1401 | sec 200 Å 3.5 μm 7.8 × 300 mm | 5.3k | 166 | 83 | 6.3k | 98.4 |
| sodium salt of polyguluronic acid sulfate | 15.1 | 0.1104 | | 8.9k | 168.2 | 84.1 | 10.5k | 99.1 |

TABLE 5-continued

Metal ion content, dn/dc, column used, weight average molecular weight
and content for several polysaccharides before and after calibration

| | A value (%) | dn/dc | column | Mw1 (Da) | X (ug) | X/Y (%) | Corrected * Mw (Da) | Corrected * content (%) |
|---|---|---|---|---|---|---|---|---|
| Sodium Polygurouronate | 10.8 | 0.1272 | TSK G3000PW XL 7.8 × 300 mm | 14.7k | 176 | 88 | 16.5k | 98.6 |
| alginic sodium diester | 16 | 0.1411 | | 15.4k | 165.8 | 82.9 | 18.3k | 98.7 |
| keratan sulfate | 5.6 | 0.1423 | | 20.3k | 183.6 | 91.8 | 21.5k | 97.2 |
| Fucoidan sulfate | 8.3 | 0.1302 | Shodex OHpak SB-803 HQ 7.8 × 300 mm | 30.0k | 177 | 88.5 | 32.7k | 96.5 |

Y is 200 μg;
* corrected by the formula in Example 1

From Table 5, it can be seen that after correction, SEC-MALS can be used to accurately calculate the weight average molecular weight of the soluble salt of acid polysaccharide, and the content was between 96-101%.

The invention claimed is:

1. A method for determining the weight average molecular weight and the content of an acidic saccharide soluble salt in a sample, comprising the following steps:
(1) determining the weight average molecular weight and content of acidic saccharide in a sample of acidic saccharide soluble salt by SEC-MALS;
(2) measuring the weight percent content A of the salt-forming metal ions in the acidic saccharide soluble salt, thereby correcting the measurement result of the weight average molecular weight and content of the acidic saccharide in step (1);
the correction is calculated according to formula 1 and Formula 2:

$$\text{Weight average molecular weight } M_w \text{ (Da)} = \cdots \cdot \frac{Mw1}{(1-A)}; \quad \text{Formula (1)}$$

In the above Formula (1): $M_{w1}$ is the weight average molecular weight (Da) of acid saccharide directly obtained by SEC-MALS; A is the content of the metal ion in the acidic saccharide soluble salt;

$$\text{Content (\%)} = \frac{X}{Y(1-A)} \times 100\%; \quad \text{Formula (2)}$$

In the above Formula (2): X is the mass of the acidic saccharide calculated by a spectrum processing software; Y is the mass of the sample; and A is the content of metal ions in the acidic saccharide soluble salt.

2. The method according to claim 1, characterized in that, the method for determining the content of metal ions in the acidic saccharide soluble salt is selected from the group consisting of ICP-MS, ICP-OES, atomic absorption and ion chromatography.

3. The method according to claim 2, characterized in that, the acidic saccharide soluble salt has one or more selected from the group consisting of a carboxyl group, a sulfate group, and a phosphate group.

4. The method according to claim 3, characterized in that, the saccharide chain structure of the acidic saccharide soluble salt includes, but is not limited to, oligomannuronic diacid, polymannuronic acid, polyguluronic acid, alginic sodium diester, polymannuronate sulfate, polyguluronate sulfate, heparin, low molecular weight heparin, chondroitin sulfate, dermatan sulfate, keratan sulfate, hyaluronic acid, PI88, fucoidan sulfate, carrageenan, and dextran sulfate.

5. The method according to claim 4, characterized in that, the saccharide chain structure of the acidic saccharide soluble salt is selected from the group consisting of oligomannuronic diacid, heparin, and low molecular weight heparin.

6. The method according to claim 1, characterized in that, the acidic saccharide soluble salt has one or more selected from the group consisting of a carboxyl group, a sulfate group, and a phosphate group.

7. The method according to claim 6, characterized in that, the saccharide chain structure of the acidic saccharide soluble salt includes, but is not limited to, oligomannuronic diacid, polymannuronic acid, polyguluronic acid, alginic sodium diester, polymannuronate sulfate, polyguluronate sulfate, heparin, low molecular weight heparin, chondroitin sulfate, dermatan sulfate, keratan sulfate, hyaluronic acid, PI88, fucoidan sulfate, carrageenan, and dextran sulfate.

8. The method according to claim 7, characterized in that, the saccharide chain structure of the acidic saccharide soluble salt is selected from the group consisting of oligomannuronic diacid, heparin, and low molecular weight heparin.

* * * * *